(12) United States Patent
Hirose (10) Patent No.: US 10,915,093 B2
(45) Date of Patent: Feb. 9, 2021

(54) NUMERICAL CONTROLLER

(71) Applicant: Fanuc Corporation, Yamanashi (JP)

(72) Inventor: Noboru Hirose, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/582,438

(22) Filed: Sep. 25, 2019

(65) Prior Publication Data

US 2020/0103852 A1 Apr. 2, 2020

(30) Foreign Application Priority Data

Sep. 28, 2018 (JP) ................. 2018-185850

(51) Int. Cl.
| | |
|---|---|
| *G05B 19/18* | (2006.01) |
| *G05B 19/414* | (2006.01) |
| *G05B 19/402* | (2006.01) |
| *G05B 19/416* | (2006.01) |

(52) U.S. Cl.
CPC ....... *G05B 19/4141* (2013.01); *G05B 19/402* (2013.01); *G05B 19/416* (2013.01); *G05B 2219/41* (2013.01); *G05B 2219/45* (2013.01); *G05B 2219/50218* (2013.01)

(58) Field of Classification Search
CPC .. G05B 19/4141; G05B 19/04; G05B 19/418; G05B 19/18; G05B 19/425
See application file for complete search history.

(56) References Cited

U.S. PATENT DOCUMENTS

| | | | |
|---|---|---|---|
| 5,260,879 A | * | 11/1993 | Sasaki .................. B23F 23/006 409/2 |
| 5,396,434 A | | 3/1995 | Oyama et al. |
| 2017/0017225 A1 | | 1/2017 | Azuma et al. |

FOREIGN PATENT DOCUMENTS

| | | |
|---|---|---|
| JP | 5-173619 A | 7/1993 |
| JP | 5931289 B | 5/2016 |

* cited by examiner

*Primary Examiner* — Cortez M Cook
(74) *Attorney, Agent, or Firm* — RatnerPrestia

(57) ABSTRACT

A numerical controller, which reciprocates a parent axis and a child axis according to a predetermined synchronization ratio by multi-axis synchronization control, is provided with a command decoding unit configured to decode a command including a plurality of command blocks, a distribution processing unit configured to generate a distribution movement amount, which is an amount of movement for each control period of a motor, based on the command blocks, an end-point correction unit configured to perform first correction processing for correcting the distribution movement amount so that a feedback position of the child axis reaches an end point, which is a turning point of the reciprocating motion, and second correction processing for recovering synchronization destroyed by the first correction processing, and a motor control unit configured to drivingly control the motor based on the corrected distribution movement amount.

5 Claims, 7 Drawing Sheets

NUMERICAL CONTROLLER

RELATED APPLICATION

The present application claims priority to Japanese Application Number 2018-185850 filed Sep. 28, 2018, the disclosure of which is hereby incorporated by reference herein in its entirety.

BACKGROUND OF THE INVENTION

Field of the Invention

The present invention relates to a numerical controller, and more particularly, to a numerical controller configured to correct a command for an end point in a reciprocating motion.

Description of the Related Art

A numerical controller having a multi-axis synchronization control function is known in the art. The multi-axis synchronization control is a control system for settling the movement amount of a child axis based on that of a parent axis. According to the multi-axis synchronization control, a trajectory in the shape of a triangle wave, such as the command waveform shown in FIG. 1, can be drawn by reciprocating the child axis at a fixed speed in a fixed direction (e.g., Y-axis direction) perpendicular to that of the parent axis that moves at a fixed speed in a fixed direction (e.g., X-axis direction). This operation is performed for a non-woven fabric wrapper that moves fibers flowing on a conveyor from side to side in synchronism with the speed of the conveyor, for example. In performing the multi-axis synchronization control, the ratio between the respective movement amounts of the parent and child axes is specified as a synchronization ratio. Thus, if the movement speed (movement amount per control period) of the parent axis is specified, then the movement speed (movement amount per control period) of the child axis that is synchronous with the parent axis is settled automatically.

Figure 1:
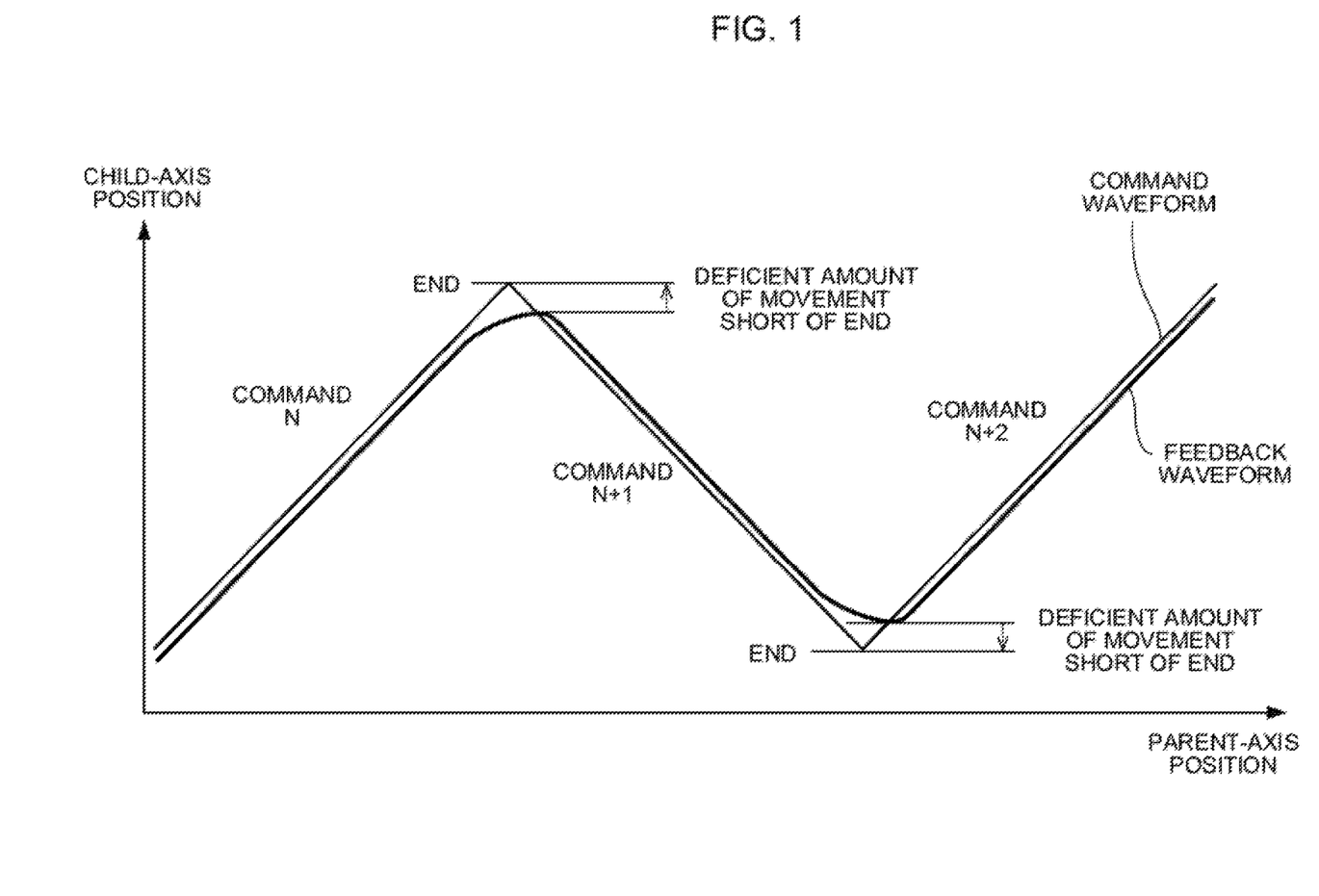
FIG. 1 is a diagram showing a problem in multi-axis synchronization control.

If the child axis makes a reciprocating motion under the multi-axis synchronization control, however, a phenomenon may sometimes occur such that the child axis cannot reach an end point, as indicated by the feedback waveform of FIG. 1. A servo delay against a reciprocating motion command is the main cause of such a phenomenon.

Presumably, this cause can be overcome by activating feedforward control. Since the child axis is synchronous with the parent axis in the multi-axis synchronization control, however, acceleration and deceleration are not performed at the end point. If the feedforward control is activated during the reciprocating motion, therefore, too much shock is caused, so that the activation is not realistic.

Methods described in Japanese Patent Application Laid-Open No. 5-173619 and Japanese Patent No. 5931289 are intended to solve similar problems in the multi-axis synchronization control.

In the methods described in Japanese Patent Application Laid-Open No. 5-173619 and Japanese Patent No. 5931289, however, a movement operation must be repeated as a correction amount is calculated by trial and error. Thus, an appropriate correction is not performed initially. Accordingly, the non-woven fabric wrapper, for example, suffers such a problem that it cannot obtain a uniform band shape in an initial stage.

Moreover, Japanese Patent Application Laid-Open No. 5-173619 and Japanese Patent No. 5931289 do not disclose any specific methods for recovering synchronization between parent and child axes after correction.

SUMMARY OF THE INVENTION

The present invention has been made to solve the above problems and has an object to provide a numerical controller configured to correct a command for an end point in a reciprocating motion.

A numerical controller according to one embodiment of the present invention is a numerical controller which reciprocates a parent axis and a child axis according to a predetermined synchronization ratio by multi-axis synchronization control, and comprises a command decoding unit configured to decode a command including a plurality of command blocks, a distribution processing unit configured to generate a distribution movement amount, which is an amount of movement for each control period of a motor, based on the command blocks, an end-point correction unit configured to perform first correction processing for correcting the distribution movement amount so that a feedback position of the child axis reaches an end point, which is a turning point of the reciprocating motion, and second correction processing for recovering synchronization destroyed by the first correction processing, and a motor control unit configured to drivingly control the motor based on the corrected distribution movement amount.

In the numerical controller according to the one embodiment of the present invention, the end-point correction unit adds, in the first correction processing, an additional movement amount ($\Delta c$) of the child axis calculated based on the child-axis feedback position and the end point to a remaining movement amount of the child axis in the command block being executed.

In the numerical controller according to the one embodiment of the present invention, the end-point correction unit corrects the synchronization ratio based on an additional movement amount ($\Delta c$) of the child axis in the first correction processing.

In the numerical controller according to the one embodiment of the present invention, the end-point correction unit subtracts, in the second correction processing, an additional movement amount ($\Delta p$) of the parent axis calculated based on the additional movement amount ($\Delta c$) of the child axis and the synchronization ratio from a remaining movement amount of the parent axis in the next command block.

In the numerical controller according to the one embodiment of the present invention, the end-point correction unit changes the synchronization ratio in the next command block for a predetermined period of time in the second correction processing.

According to the present invention, there can be provided a numerical controller configured to correct a command for an end point in a reciprocating motion.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiment 1

A numerical controller 1 according to Embodiment 1 moves the feedback position of a child axis to an end point by the following method.

(1) An amount of movement before the child-axis feedback position reaches the end point is calculated at the time of final distribution in a command block.

(2) The command block is extended for the amount of movement calculated in (1) above and synchronization is continued during the movement.

(3) After (2) above, acceleration is performed in a first fixed period of the next block for a turnaround, whereby a position delayed relative to a parent axis is recovered.

Figure 7:
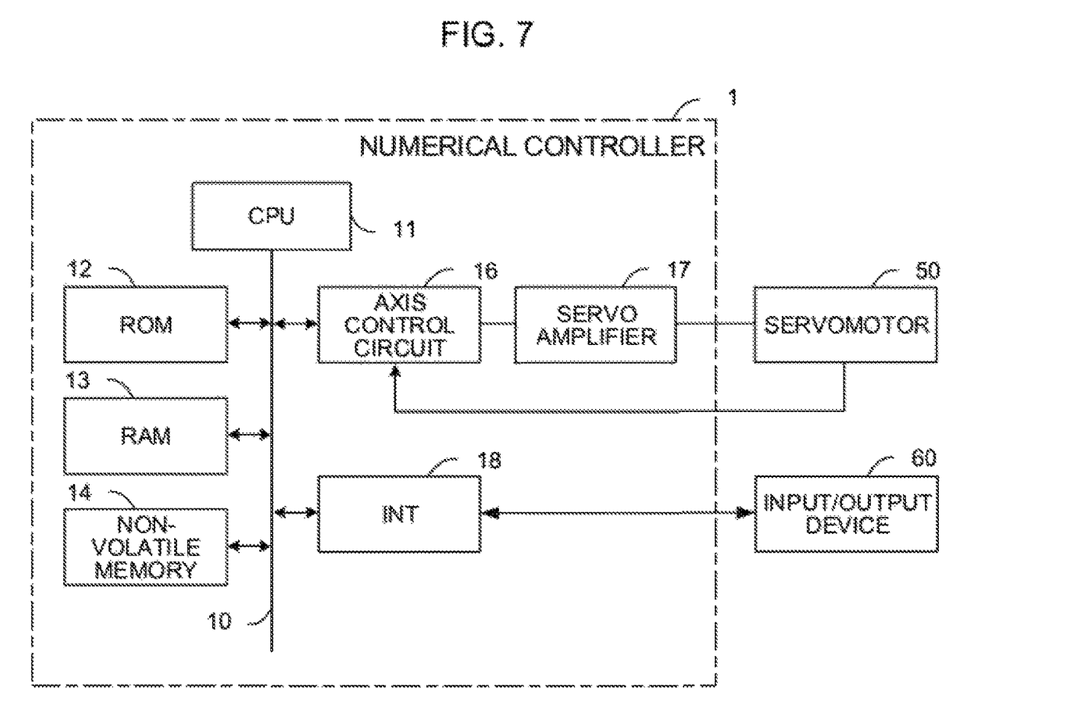
FIG. 7 is a diagram showing a hardware configuration example of a numerical controller.

FIG. 7 is a schematic hardware configuration diagram showing principal parts of the numerical controller 1 according to Embodiment 1. The numerical controller 1 is a device that controls industrial machines including machine tools. The numerical controller 1 comprises a CPU 11, ROM 12, RAM 13, non-volatile memory 14, bus 10, axis control circuit 16, servo amplifier 17, and interface 18. The numerical controller 1 is connected with a servomotor 50 and an input/output device 60.

The CPU 11 is a processor for generally controlling the numerical controller 1. The CPU 11 reads out a system program stored in the ROM 12 via the bus 10 and controls the entire numerical controller 1 according to the system program.

The ROM 12 is previously loaded with system programs for executing various controls of industrial machines such as a non-woven fabric wrapper and a machine tool.

The RAM 13 temporarily stores temporary calculation data and display data, data and programs input by an operator through the input/output device 60, and the like.

The non-volatile memory 14 is backed by, for example, a battery (not shown) so that its storage state can be maintained even when the numerical controller 1 is switched off. The non-volatile memory 14 stores data, programs, and the like input through the input/output device 60. The programs and data stored in the non-volatile memory 14 may be developed in the RAM 13 during execution and use.

The axis control circuit 16 controls the motion axes of the industrial machines. The axis control circuit 16 receives a movement command amount for each axis output by the CPU 11 and outputs a movement command for the motion axes to the servo amplifier 17.

On receiving the axis movement command output by the axis control circuit 16, the servo amplifier 17 drives the servomotor 50.

The servomotor 50 is driven by the servo amplifier 17 to move the motion axes of the industrial machines. The servomotor 50 typically has a position/speed detector built-in. The position/speed detector outputs a position/speed feedback signal, and position/speed feedback control is performed as this signal is fed back to the axis control circuit 16.

In FIG. 7, the axis control circuit 16, servo amplifier 17, and servomotor 50 are each shown as being only one in number. Actually, however, these elements are provided corresponding in number to the axes of the industrial machine to be controlled. In controlling two axes, e.g., the parent and child axes, the axis control circuit 16, servo amplifier 17, and servomotor 50 are provided in two sets.

The input/output device 60 is a data input/output device equipped with a display, hardware keys, and the like, and is typically an MDI or control panel. The input/output device 60 displays information received from the CPU 11 through the interface 18 on the display. The input/output device 60 delivers commands and data input from the hardware keys and the like to the CPU 11 through the interface 18.

Figure 8:
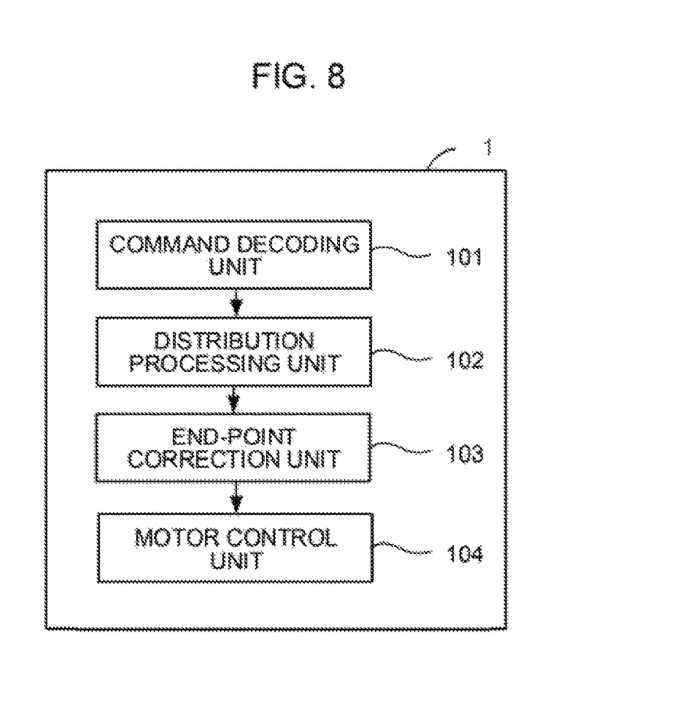
FIG. 8 is a diagram showing a functional configuration example of the numerical controller.

FIG. 8 is a block diagram showing a characteristic functional configuration of the numerical controller 1. The numerical controller 1 typically comprises a command decoding unit 101, distribution processing unit 102, end-point correction unit 103, and motor control unit 104.

The command decoding unit 101 reads a command (typically, an NC program, etc.) including a plurality of command blocks from, for example, the non-volatile memory 14 onto the RAM 13 and analyzes it.

Based on the result of the analysis by the command decoding unit 101, the distribution processing unit 102 creates a distribution movement amount, which is an amount of movement for each control period of the servomotor 50 to be controlled.

The end-point correction unit 103 corrects the distribution movement amount created by the distribution processing unit 102 and generates a distribution movement amount such that the child-axis feedback position reaches the end point. The corrected distribution movement amount is output to the motor control unit 104.

The motor control unit 104 drivingly controls the servomotor 50 based on the corrected distribution movement amount input from the end-point correction unit 103.

Figure 2:
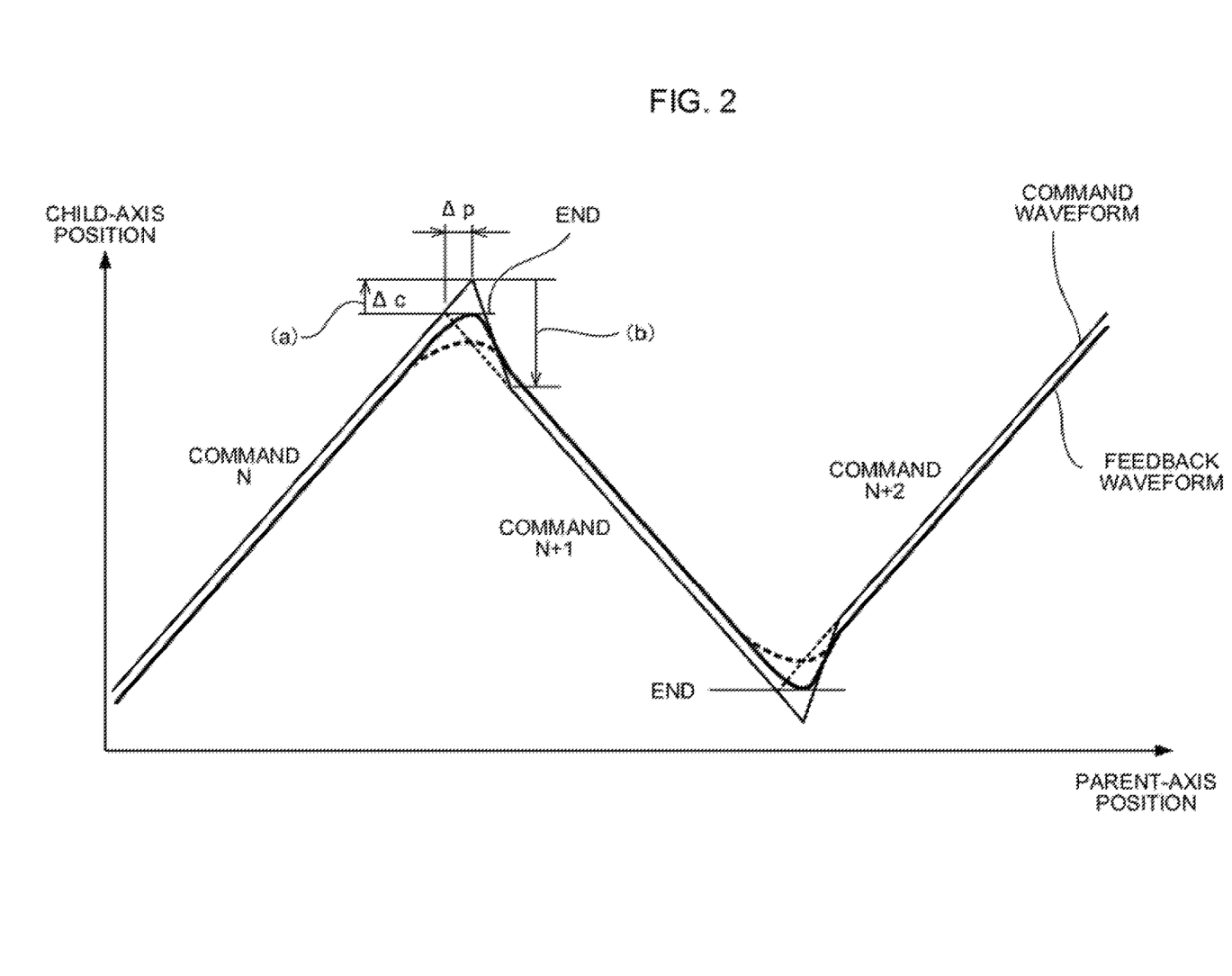
FIG. 2 is a diagram showing an operation of an end-point correction unit according to Embodiment 1.
Figure 3:
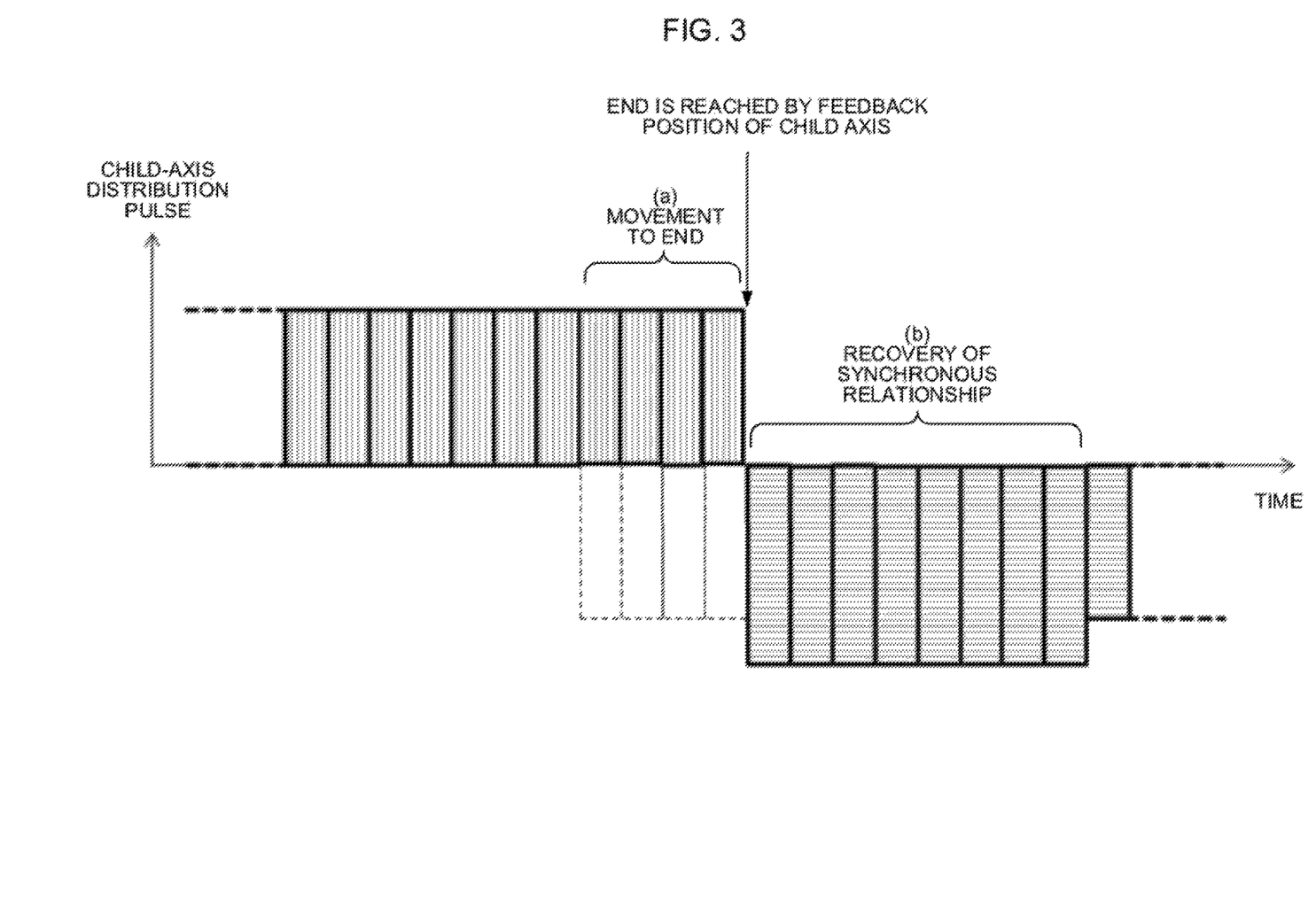
FIG. 3 is a diagram showing an operation of the end-point correction unit according to Embodiment 1.

The operation of end-point correction unit 103 for implementing (1) to (3) above will be described with reference to FIGS. 2 and 3. FIG. 2 is a diagram showing a command waveform and a feedback waveform corrected by this processing. A thick full line represents the corrected feedback waveform, and a thick broken line represents the feedback waveform before the correction. FIG. 3 is a diagram showing a distribution movement amount (child-axis distribution pulse) generated by this correction processing. The end-point correction unit 103 corrects an original command waveform (based on the distribution movement amount created by the distribution processing unit 102) as (a) so that the actual position of the child axis reaches both ends, immediately before the command position reaches the end. Moreover, correction (b) for restoring the original command waveform is performed immediately after the corrected position is reached by the command position.

The following is a specific description of the correction processing (a), that is, correction processing for causing the child axis to reach the end. This processing is performed immediately before the child axis reaches the end.

[1] An amount of movement ($\Delta c$) on a command additionally required for the current feedback position of the child axis to reach the end is calculated on termination of commands in an execution block N. A method for calculating the movement amount $\Delta c$ will be described later.

[2] A parent-axis movement amount ($\Delta p$) is calculated based on a synchronization ratio ($\alpha$=child-axis movement amount/parent-axis movement amount) of the execution block N and the movement amount $\Delta c$ calculated in [1] above.

[3] The movement amounts $\Delta c$ and $\Delta p$ calculated in [1] and [2] above are reflected in (or added to) the remaining movement amount in the execution block N. Specifically, the remaining movement amounts in the command block N currently being executed are changed as follows:

remaining movement amount of child axis=current remaining movement amount of child axis+$\Delta c$, and
remaining movement amount of parent axis=current remaining movement amount of parent axis+$\Delta p$.

The following is a specific description of the correction processing (b), that is, processing for recovering the synchronous relationship. This processing is performed immediately after the end is reached by the child axis.

[1] After the end is reached by the child axis, $\Delta p$ is subtracted from the remaining movement amount of the parent axis in an execution block N+1. Specifically, the remaining movement amount in the execution block N+1 after a turnaround from the arrival at the end point (with the child axis moved in the opposite direction) is changed as follows:

remaining movement amount of child axis=command movement amount of child axis in next block, and
remaining movement amount of parent axis=command movement amount of parent axis in next block−$\Delta p$.

[2] After the end is reached by the child axis, the child axis is located in a position delayed relative to the position of the parent axis by ($2 \times \Delta c$). In order to recover this delay, a child-axis movement amount based on the control period calculated from the child- and parent-axis movement amounts in the execution block N+1 is corrected (or accelerated) for a period of time specified by a parameter or the like. Specifically, the synchronization ratio is changed for a fixed period of time so that the delay is recovered.

Figure 6:
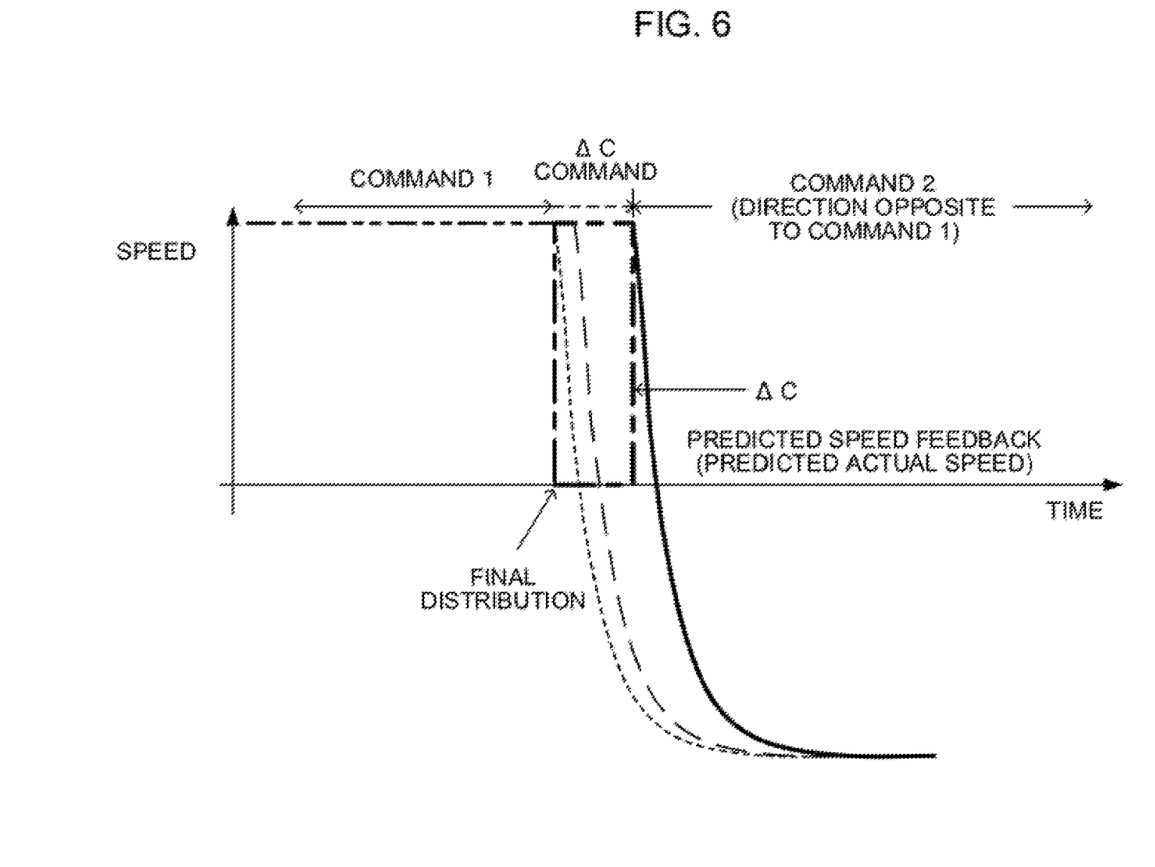
FIG. 6 is a diagram showing operations of the end-point correction units according to Embodiments 1 and 2.

The method for calculating the movement amount $\Delta c$ will be described with reference to FIG. 6. The end-point correction unit 103 performs the following prediction and calculates the movement amount $\Delta c$ at the time of final distribution in the command block N.

[1] It is assumed that the command block N+1 (with the child axis moved in the opposite direction relative to the command block N) is started (i.e., $\Delta c=0$) in the next control period.

[2] Predicted speed feedback values (predicted actual speeds) for the next and subsequent periods are calculated based on the assumed movement amount $\Delta c$, a speed command, a position loop gain, and a position feedback value (actual position) at the time of the final distribution in the command block N. It is determined whether or not the end is reached by the predicted position feedback value (predicted actual position) at the time of sign inversion of the predicted speed feedback value.

[3] If the position feedback predicted in [2] above is short of the end, the assumption is corrected so as to extend the command block N (or add a predetermined amount to $\Delta c$) and the determination of [2] is performed again. If the end is reached by the position feedback predicted in [2] above, in contrast, the movement amount $\Delta c$ at that time is employed as the movement amount $\Delta c$ used in the above correction processing steps (a) and (b).

The end-point correction unit 103 may briefly adopt the difference (or shortage) between the end and the position feedback predicted if $\Delta c=0$ is given as the movement amount $\Delta c$ used in the above correction processing steps (a) and (b).

Embodiment 2

Embodiment 2, as compared with Embodiment 1, is characterized in that the start timing of the next block N+1 cannot be shifted. A numerical controller 1 according to Embodiment 2 moves the feedback position of a child axis to an end point by the following method.

(1) An amount of movement before the child-axis feedback position reaches the end point is calculated at an appropriate point in time before the arrival at the end point.

(2) The movement amount calculated in (1) above is divided and added for a fixed period of time. Specifically, the speed is increased.

(3) After (2) above, acceleration is performed in a first fixed period of the next block for a turnaround, whereby a position delayed relative to a parent axis is recovered.

Since the hardware configuration and functional configuration of the numerical controller 1 of Embodiment 2 are similar to those of Embodiment 1, a description thereof is omitted.

Figure 4:
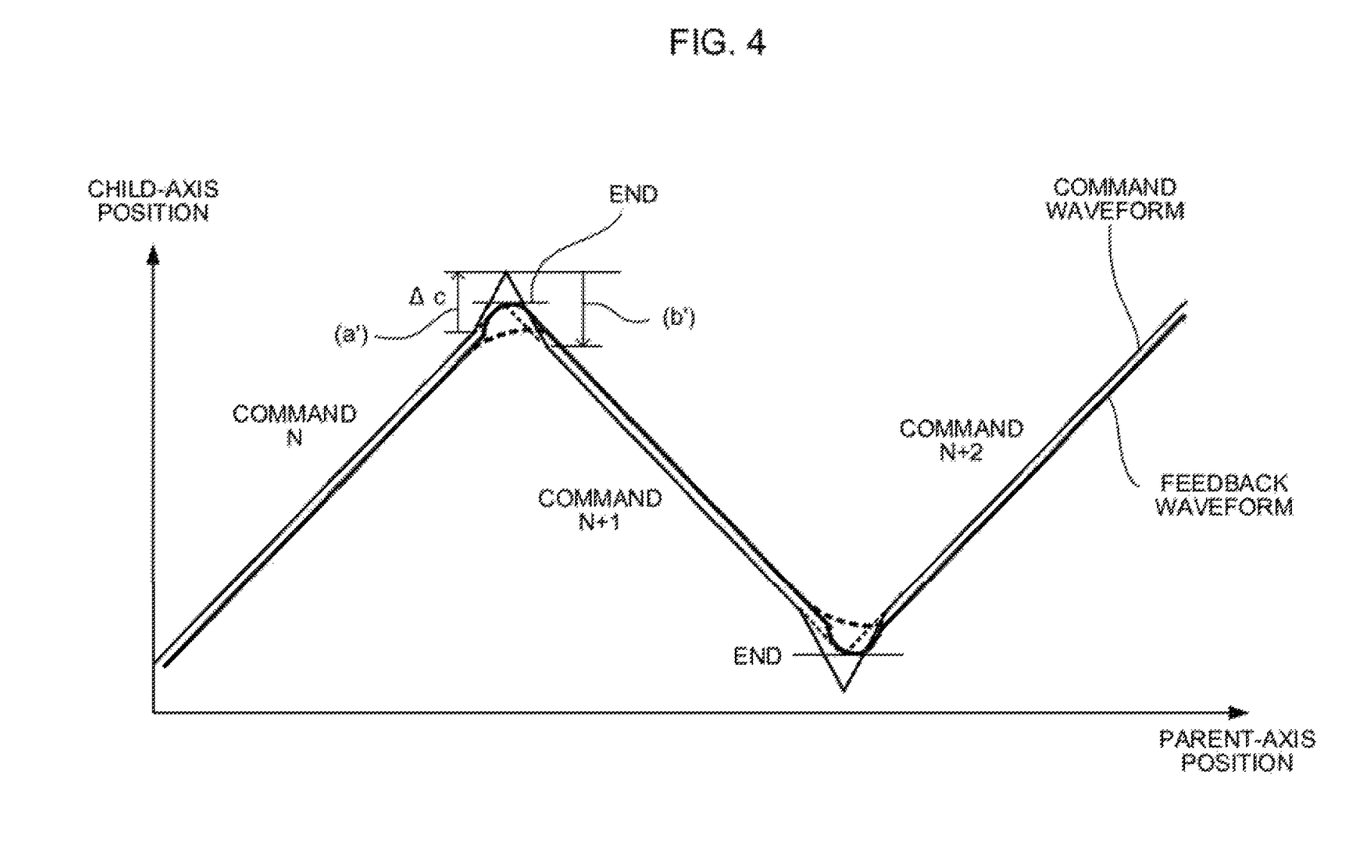
FIG. 4 is a diagram showing an operation of an end-point correction unit according to Embodiment 2.
Figure 5:
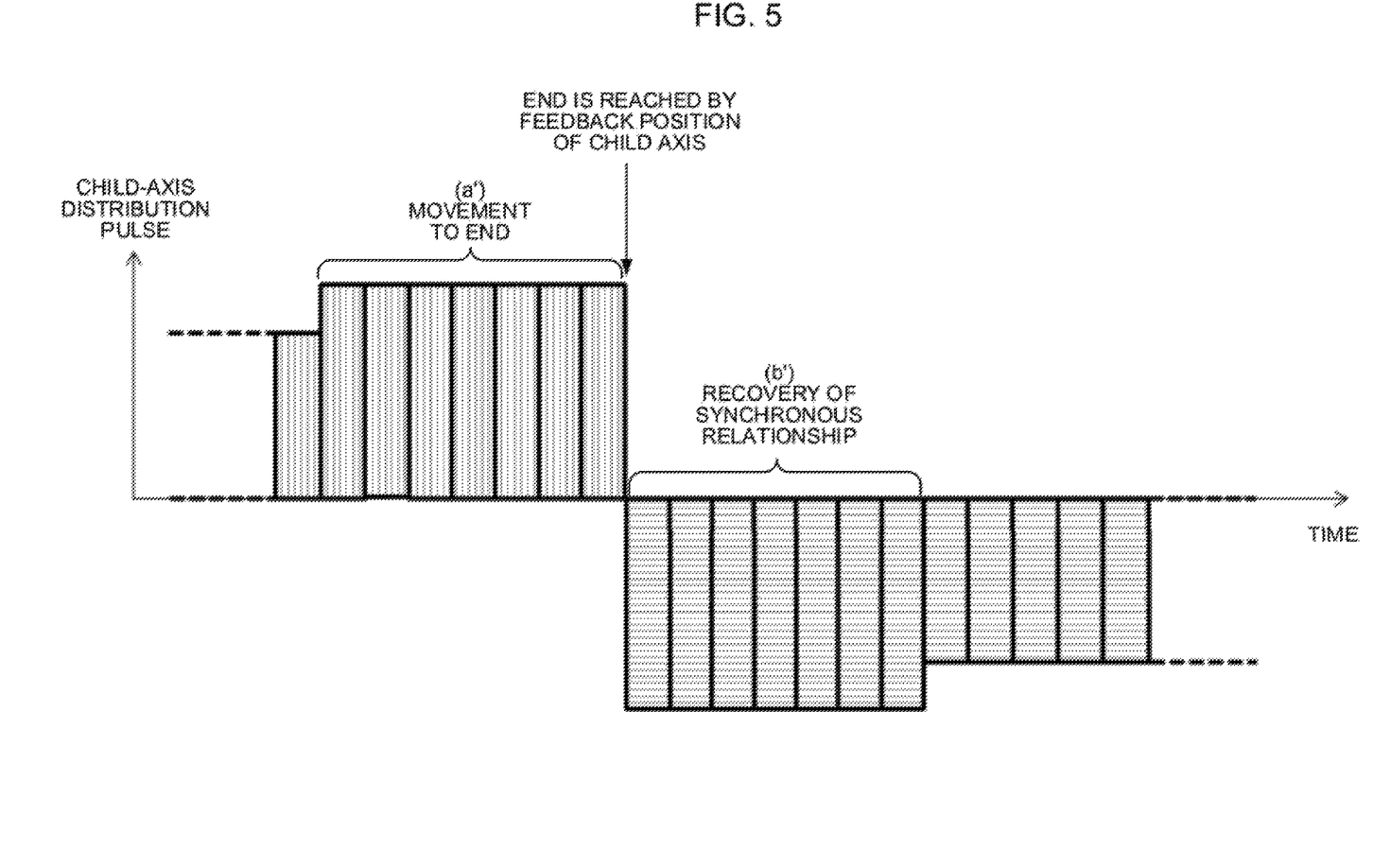
FIG. 5 is a diagram showing an operation of an end-point correction unit according to Embodiment 2.

The operation of end-point correction unit 103 for implementing (1) to (3) above will be described with reference to FIGS. 4 and 5. FIG. 4 is a diagram showing a command waveform and a feedback waveform corrected by this processing. A thick full line represents the corrected feedback waveform, and a thick broken line represents the feedback waveform before the correction. FIG. 5 is a diagram showing a distribution movement amount (child-axis distribution pulse) generated by this correction processing. The end-point correction unit 103 corrects an original command waveform (based on the distribution movement amount created by the distribution processing unit 102) as (a') so that the actual position of the child axis reaches both ends, before the command position reaches the end (i.e., at a point in time preceding by a preset period of time). Moreover, correction (b') for restoring the original command waveform is performed immediately after the corrected position is reached by the command position.

The following is a specific description of the correction processing (a'), that is, correction processing for causing the child axis to reach the end. This processing is performed at an appropriate point in time before the child axis reaches the end.

[1] An amount of movement ($\Delta c$) on a command additionally required for the current feedback position of the child axis to reach the end is calculated at a point in time preceding the termination of commands in an execution block N by a period of time previously specified by a parameter or the like. The method for calculating the movement amount $\Delta c$ has already been described in connection with Embodiment 1.

[2] The movement amount $\Delta c$ calculated in [1] above is reflected in (or added to) the child-axis movement amount of the synchronization ratio ($\alpha$=child-axis movement amount/parent-axis movement amount) of the execution block N and the synchronization ratio is changed as follows:

$\alpha'$=(child-axis movement amount+$\Delta c$)/parent-axis movement amount.

[3] The movement amount $\Delta c$ calculated in [1] above is reflected in (or added to) the remaining movement amount in the execution block N. Specifically, the remaining movement amount in the command block N currently being executed is changed as follows:

remaining movement amount of child axis=current remaining movement amount of child axis+Δc.

The following is a specific description of the correction processing (b'), that is, processing for recovering the synchronous relationship. This processing is performed immediately after the end is reached by the child axis.

[1] After the end is reached by the child axis, the child axis is located in a position delayed relative to the position of the parent axis by Δc. In order to recover this delay, a child-axis movement amount based on the control period calculated from the child- and parent-axis movement amounts in the execution block N+1 is corrected (or accelerated) for a period of time specified by a parameter or the like. Specifically, the synchronization ratio is changed for a fixed period of time so that the delay is recovered.

According to these embodiments, the end-point correction unit 103 calculates an additional movement amount Δc required for the arrival at the end point before the child axis reaches the end point and corrects the command for implementing the movement amount Δc. In this way, a reciprocating motion under multi-axis synchronization control can be properly corrected without trial and error.

Moreover, according to the above embodiments, the end-point correction unit 103 performs control for recovering the synchronization between the parent axis and the child axis after the execution of the correction processing. Thus, the synchronization can immediately be recovered even if the axes are temporarily rendered asynchronous by the correction processing, so that a uniform band shape of, for example, a non-woven fabric wrapper cannot be damaged.

While embodiments of the present invention have been described above, the invention is not limited to the examples of the above-described embodiments and may be suitably modified and embodied in other forms.

The invention claimed is:

1. A numerical controller configured to reciprocate a parent axis and a child axis according to a predetermined synchronization ratio by multi-axis synchronization control, the numerical controller comprising:
   a command decoding unit configured to decode a command including a plurality of command blocks;
   a distribution processing unit configured to generate a distribution movement amount, which is an amount of movement for each control period of a motor, based on the command blocks;
   an end-point correction unit configured to perform first correction processing for correcting the distribution movement amount so that a feedback position of the child axis reaches an end point, which is a turning point of the reciprocating motion, and second correction processing for recovering synchronization destroyed by the first correction processing; and
   a motor control unit configured to drivingly control the motor based on the corrected distribution movement amount.

2. The numerical controller according to claim 1, wherein the end-point correction unit adds, in the first correction processing, an additional movement amount (Δc) of the child axis calculated based on the child-axis feedback position and the end point to a remaining movement amount of the child axis in the command block being executed.

3. The numerical controller according to claim 1, wherein the end-point correction unit corrects the synchronization ratio based on an additional movement amount (Δc) of the child axis in the first correction processing.

4. The numerical controller according to claim 2, wherein the end-point correction unit subtracts, in the second correction processing, an additional movement amount (Δp) of the parent axis calculated based on the additional movement amount (Δc) of the child axis and the synchronization ratio from a remaining movement amount of the parent axis in the next command block.

5. The numerical controller according to claim 1, wherein the end-point correction unit changes the synchronization ratio in the next command block for a predetermined period of time in the second correction processing.

* * * * *